(12) United States Patent
Yang et al.

(10) Patent No.: US 8,387,356 B2
(45) Date of Patent: Mar. 5, 2013

(54) METHOD OF INCREASING POWER OUTPUT OF A COMBINED CYCLE POWER PLANT DURING SELECT OPERATING PERIODS

(75) Inventors: Virginia Wen-Chi Yang, Latham, NY (US); Gordon Raymond Smith, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 12/610,666

(22) Filed: Nov. 2, 2009

(65) Prior Publication Data

US 2011/0099972 A1    May 5, 2011

(51) Int. Cl.
   *F02C 6/00* (2006.01)
(52) U.S. Cl. .................................................. 60/39.182
(58) Field of Classification Search ............... 60/39.182, 60/773, 776
   See application file for complete search history.

(56) References Cited

U.S. PATENT DOCUMENTS

| | | | | |
|---|---|---|---|---|
| 3,879,616 A | * | 4/1975 | Baker et al. | 290/40 R |
| 5,379,588 A | * | 1/1995 | Tomlinson et al. | 60/39.182 |
| 5,412,937 A | * | 5/1995 | Tomlinson et al. | 60/783 |
| 5,628,179 A | * | 5/1997 | Tomlinson | 60/783 |
| 6,442,924 B1 | | 9/2002 | Talley et al. | |
| 2002/0194832 A1 | * | 12/2002 | Smith | 60/39.182 |
| 2003/0131601 A1 | * | 7/2003 | Baxter | 60/772 |
| 2007/0017207 A1 | * | 1/2007 | Smith et al. | 60/39.182 |
| 2010/0162721 A1 | * | 7/2010 | Welch et al. | 60/778 |

* cited by examiner

*Primary Examiner* — Phutthiwat Wongwian
(74) *Attorney, Agent, or Firm* — Cantor Colburn LLP

(57) ABSTRACT

A method of increasing output of a combined cycle power plant with supplemental duct firing from a heat recovery steam generator (HRSG) during select periods includes guiding a reheat steam flow to at least one reheat attemperator fluidly connected to the HRSG during the select period. The method further includes increasing reheat attemperation water flow through the at least one reheat attemperator, decreasing a set point temperature of the at least one reheat attemperator for the select period to a lower set point temperature, and raising power output of the combined cycle power plant during the select period.

9 Claims, 1 Drawing Sheet

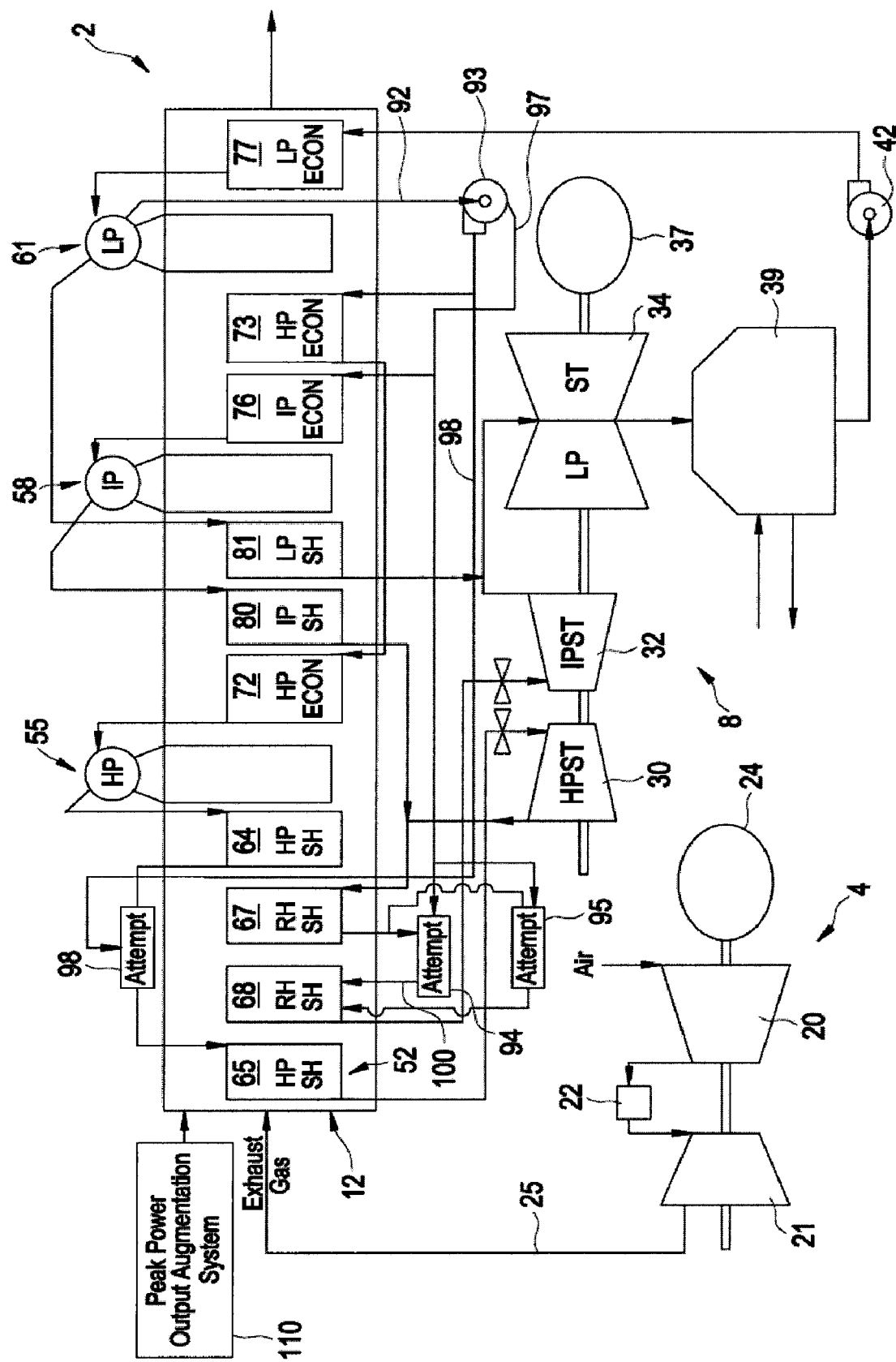

METHOD OF INCREASING POWER OUTPUT OF A COMBINED CYCLE POWER PLANT DURING SELECT OPERATING PERIODS

BACKGROUND OF THE INVENTION

The subject matter disclosed herein relates to combined cycle power plants and, more particularly, to a method of increasing power output from a combined cycle power plant during select operating periods.

Many combined cycle plants today include power augmentation supplied by supplementary firing from a heat recovery steam generator (HRSG). The supplementary firing is done either ahead of or within the HRSG to achieve additional steam production to increase an overall plant power output to a power grid. The HRSG supplementary firing is most frequently utilized to provide a significant amount of output increase during peak operating periods, such as on hot summer days, during which gas turbine power is down and electricity demand is high. The amount of the power augmentation is limited by a number of equipment limits, such as, a steam turbine throttle pressure (high pressure turbine inlet pressure) limit, HRSG duct burner exit temperature limit, steam turbine exhaust pressure limit and the like. In addition to equipment limits, power augmentation is also constrained by an environmental permit issued to the power plant. Once any of the equipment limits and/or environmental limits is reached, the combined cycle power plant can no longer increase power output. As a result, brown-outs and/or black-outs are possible if the power demand exceeds the maximum power that the combined cycle power plant can deliver.

BRIEF DESCRIPTION OF THE INVENTION

According to one aspect of the invention, a method of increasing output of a combined cycle power plant with supplemental duct firing from a heat recovery steam generator (HRSG) during select periods includes guiding a reheat steam flow to at least one reheat attemperator fluidly connected to the HRSG during the select period. The method further includes increasing reheat attemperation water flow through the at least one reheat attemperator, decreasing a set point temperature of the at least one reheat attemperator for the select period to a lower set point temperature, and raising power output of the combined cycle power plant during the select period.

According to another aspect of an exemplary embodiment, a combined cycle power plant includes a gas turbine, a steam turbine, and a heat recovery steam generator (HRSG) fluidly connected between the gas turbine and the steam turbine. The HRSG includes a duct burner configured and disposed for supplementary firing. At least one reheat attemperator is fluidly connected between the steam turbine and the HRSG, and a power output augmentation system operatively coupled to the HRSG. The power output augmentation system is configured and disposed to selectively lower a set point temperature of the at least one reheat attemperator only during select periods in order to increase power output of the combined cycle power plant.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is schematic drawing of a combined cycled power plant including a power output augmentation system in accordance with an exemplary embodiment.

The detailed description explains embodiments of the invention, together with advantages and features, by way of example with reference to the drawings.

DETAILED DESCRIPTION OF THE INVENTION

With initial reference to FIG. 1, a combined cycle power plant (CCP) constructed in accordance with an exemplary embodiment is indicated generally at 2. CCP 2 includes a gas turbine 4 operatively connected to a steam turbine 8 through a heat recovery steam generator (HRSG) 12. Gas turbine 4 includes a compressor 20 operatively coupled to a turbine 21 through a combustor 22. Gas turbine 4 is further shown to include a generator 24 coupled to compressor 20. During operation, exhaust gases are passed to HRSG 12 via an exhaust gas line 25. As further shown in FIG. 1, steam turbine 8 includes a high pressure (HP) portion 30, an intermediate pressure (IP) portion 32 and a low pressure (LP) portion 34. In a manner similar to that described above, LP portion 34 is operatively connected to a generator 37. LP portion 34 is also connected to a condenser 39 that is linked to HRSG 12 via a pump 42. HRSG 12 includes a superheater (SH) portion 52, a high pressure (HP) drum-evaporator 55, an intermediate pressure (IP) drum-evaporator 58, and a low pressure (LP) drum evaporator 61. At this point it should be understood that the above-described arrangement is but one example of a combined cycle power plant, other configurations could also be employed in accordance with the exemplary embodiments. For example, steam turbine 8 may also be utilized in tandem to drive a single load via a single shaft.

HRSG 12 includes a primary high pressure superheater (HP) (SH) zone 64 and a finishing high pressure superheater (HP)(SH) zone 65, a primary reheater superheater (RH) (SH) zone 67 and secondary reheater superheater (RH) (SH) zone 68, two HP economizer (Econ) zones 72 and 73, an IP Econ 76, an LP Econ 77 as well as an IP superheater 80 and an LP superheater 81. Low pressure feedwater passes through a low pressure conduit 92 to pump 93 having an intermediate pressure bleed (not separately labeled). From the intermediate pressure bleed of pump 93, intermediate pressure feedwater passes to a first reheat attemperator 94, and optionally to a second reheat attemperator 95, via a conduit 97. HRSG 12 is also shown to include a first inter-stage attemperator 98 located in between primary HP SH zone 64 and finishing HP SH zone 65. First inter-stage attemperator 98 may allow for more robust control of steam exit temperature from finishing HP SH 65. Specifically, first inter-stage attemperator 98 may be configured to control the temperature of steam exiting finishing HP SH 65 by injecting cooler feedwater spray whenever the temperature of the exiting steam exceeds a predetermined value, e.g., the design value for the plant.

Primary RH SH 67 and secondary RH SH 68 are associated with first reheat attemperator 94. First reheat attemperator 94 operates to control exit steam temperature from secondary RH SH 68. Specifically, first reheat attemperator 94, and optionally second reheat attemperator 95 for increasing attemperation capacity, are be configured to control steam temperature exiting secondary RH SH 68 by injecting cooler feedwater spray whenever steam temperature exceeds a predetermined value. At this point it should be understood that HRSG 12 illustrated in FIG. 1 is a simplified depiction of an HRSG and is not intended to be limiting. Rather, the illustrated HRSG is shown to convey the general operation of such HRSG systems. During selected periods, such as during periods of high or peak electrical demand on hot summer days, it is necessary to increase power output from CCP 2 in order to meet demand.

In accordance with an exemplary embodiment of the invention, CCP 2 includes a power output of augmentation system 110 that is operatively linked to HRSG 12. During select periods, such as periods of high or peak demand, power output augmentation system 110 is activated to increase power demand by as much as about 0.2% to about 2.0% over and above standard power augmentation provided by HRSG supplementary firing. During periods of high power demand, when additional output is required and power augmentation from HRSG supplemental firing is at capacity, power output augmentation system 110 lowers a set point temperature for first reheat attemperators 94, and optionally second reheat attemperator 95. High power demand should be understood to mean those time periods during which power demand approaches power output limits for a power plant. In accordance with one aspect of the invention, the set point temperature for reheat attemperator 94 and/or reheat attemperator 95 is lowered by between about 10° F. (6° C.) and about 70° F. (42° C.). Most preferably, the set point temperature of attemperator 94 is lowered about 40° F. (24° C.). Of course the temperature change can vary from as little as 1° F. (0.6° C.) to as much as 100° F. (60° C.) or more depending upon HRSG design, local conditions and the like.

Steam temperature at an inlet to HP steam turbine 30 is typically about 1050° F. In accordance with the exemplary embodiment, power augmentation system 110 lowers the reheat attemperator temperature set point(s) from the typical 1050° F. (565.55° C.) to about 1010° F. (543.33° C.). Of course the set point(s) can be further lowered depending upon operation constraints and power costs. In order to achieve the lower set point, reheat attemperation water (feedwater) flowing through reheat attemperator 94, and optionally reheat attemperator 95, will need to increase. The increased flow in reheat attemperation water produces a greater output from CCP 2.

Lowering the set point temperature of reheat attemperator 94 and, optionally reheat attemperator 95, from an optimal level is counter intuitive. That is, the lower set point requires an increase in reheat attemperation water flow that is thermally less efficient for CCP 2. The efficiency losses occur from the lower steam temperature being a less efficient thermodynamic cycle, the additional water required in the cycle requires additional energy to evaporate and, fuel burnt in the HRSG duct increases. However, it has been found that, up to a point, the decrease in thermal efficiency from lowering set point temperatures in reheat attemperator 94, and optionally reheat attemperator 95, enables an increase in CCP2 power output that is economically justified.

During peak periods, suppliers can charge an increased cost for the additional electrical output. The inefficiencies created by the lower set point temperatures, which, normally would have a negative impact on the cost per KWh, can be offset during high or peak power periods when the price of power increases. It should be noted however, that beyond a certain point, power produced from set point temperature lowering would no longer be efficient, either the power plant can no longer produce more power, or the power plant is spending more money to produce power than they are receiving an exchange for the power produced then lowering the set point temperature of the reheat attemperator(s) any further would be counter productive. Thus, the present invention provides a system for extracting additional power from a combined cycle power plant during select, e.g., peak periods, when what would normally be an inefficient operating point, is cost effective.

At this point it should be understood that the exemplary embodiments could also be applied in conjunction with other power augmentation used in a combined cycle system in addition to the HRSG duct firing. For example the exemplary embodiment could be employed in conjunction with the operation of evaporative cooler for gas turbine. The operation of direct article gas turbine evaporative cooler potentially extends the capability of peaking through reheat attemperation. The extension of the peaking capability comes from the decrease in the gas turbine exhaust temperature due to the colder gas turbine inlet air cooled by the evaporative cooler.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined cycle power plant comprising:
   a gas turbine;
   a steam turbine;
   a heat recovery steam generator (HRSG) fluidly connected between the gas turbine and the steam turbine, the HRSG being configured and disposed for supplementary firing;
   a reheat attemperator connected to a feed water pump via a feed water line, the feed water pump received a low pressure feed water from a low pressure drum evaporator via a low pressure conduit extending from the HRSG, the at least one attemperator fluidly connected to a superheater portion of the HRSG to supply steam to an intermediate pressure stage of the steam turbine; and
   a power output augmentation system operatively coupled to the HRSG, the power output augmentation system being configured and disposed control the feed water pump to selectively lower a set point temperature of the at least one reheat attemperator only during select periods in order to increase power output of the combined cycle power plant.

2. The combined cycle power plant according to claim 1, wherein the set point temperature of the at least one attemperator is decreased between about 10° F. (6° C.) and about 70° F. (38.9° C.).

3. The combined cycle power plant according to claim 2, wherein the reheat attemperator is fluidly connected between the steam turbine and a reheat portion of the HRSG.

4. The combined cycle power plant according to claim 3, further comprising: another reheat attemperators, both the reheat attemperator and the another reheat attemperator being coupled between the steam turbine and a reheat portion of the HRSG.

5. The combined cycle power plant according to claim 4, wherein the reheat attemperator is connected to a superheater portion of the reheat portion.

6. The combined cycle power plant according to claim 5, wherein the another reheat attemperator is connected to a superheater portion of the reheat portion.

7. The combined cycle power plant according to claim 6, wherein the power output augmentation system is configured and disposed to selectively lower the set point temperature of both the first and second reheat attemperators.

8. The combined cycle power plant according to claim 1, wherein the power output augmentation system is configured and disposed to selectively lower the set point temperature of the at least one reheat attemperator during periods of high power demand.

9. The combined cycle power plant according to claim 1, wherein the power output augmentation system is configured and disposed to selectively lower the set point temperature of the at least one reheat attemperator during periods of peak power demand.

* * * * *